United States Patent [19]

Kopp

[11] Patent Number: 4,588,892
[45] Date of Patent: May 13, 1986

[54] WIDE-RANGE RADIATION DOSE MONITOR

[75] Inventor: Manfred K. Kopp, Oak Ridge, Tenn.

[73] Assignee: The United States of America as represented by the United States Department of Energy, Washington, D.C.

[21] Appl. No.: 652,395

[22] Filed: Sep. 20, 1984

[51] Int. Cl.⁴ .................. H01J 47/06; G01T 1/16; G01T 1/175
[52] U.S. Cl. ................................. 250/374; 250/388
[58] Field of Search ................ 250/374, 388, 387, 386

[56] References Cited

U.S. PATENT DOCUMENTS 2,931,907  4/1960  Cohen et al. .................. 250/386

OTHER PUBLICATIONS

A. Arbel, J. Booz, K. D. Müller and H. Neuhauss, "Development of a Portable Microdosimetric Radiation Protection Monitor Covering a Dynamic Range of 120dB Above Noise", *IEEE Trans. Nucl. Sci.*, vol. 31, No. 1 (Feb. 1984) pp. 691–696.

T. E. Cassada, "A Low Level Environmental Radiation Monitor with High Sensitivity, Stability and Dynamic Range", *IEEE Trans. Nucl. Sci.*, vol. 16, No. 1 (1969) pp. 405–410.

*Primary Examiner*—Alfred E. Smith
*Assistant Examiner*—Constantine Hannaher
*Attorney, Agent, or Firm*—David E. Breeden; Stephen D. Hamel; Judson R. Hightower

[57] ABSTRACT

A radiation dose-rate monitor is provided which operates in a conventional linear mode for radiation in the 0 to 0.5 R/h range and utilizes a nonlinear mode of operation for sensing radiation from 0.5 R/h to over 500 R/h. The nonlinear mode is achieved by a feedback circuit which adjusts the high voltage bias of the proportional counter, and hence its gas gain, in accordance with the amount of radiation being monitored. This allows compression of readout onto a single scale over the range of 0 to greater than 500 R/h without scale switching operations.

4 Claims, 3 Drawing Figures

WIDE-RANGE RADIATION DOSE MONITOR

BACKGROUND OF THE INVENTION

The present invention relates generally to radiation dose-rate monitors and more specifically to a wide-range dose-rate monitor which does not require scale switching for wide-range radiation dose-rate monitoring. This invention is a result of a contract with the United States Department of Energy.

Most radiation monitors, like the personal pocket dosimeter for example, measure the degree of discharge of a capacitance-type device which is discharged by the current from an ionization chamber. Such a measurement is equivalent to the total absorbed radiation dose. For a person suddenly exposed to radiation field, a measurement of the dose-rate would be more useful than the total dose.

The Federal Emergency Management Agency (FEMA) has requested that a wide-range radiation dose-rate monitor be developed. The new instrument should span the range of two existing dose-rate meters, the CDV-700 and the CDV-715, because in an emergency radiation situation a person should not have to perform scale switching operations to obtain a dose-rate reading.

In particular, an instrument is needed which has the following characteristics:

(1) sensitivity in the range from 0 to 500 Roentgens/hour (R/h), readable on one nonswitchable scale;
(2) linear readout in the range from 0 to 0.5 R/h;
(3) nonparalyzable and nonsaturatable response to radiation;
(4) small size, portability, and low power consumption.

SUMMARY OF THE INVENTION

In view of the above need it is an object of this invention to provide a sensitive wide-range radiation dose-rate monitor which does not require scale switching for readout over the entire detection range.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

Briefly, the invention which is capable of meeting all of the desired characteristics, is based on a proportional counter detector. A feedback circuit is provided which operates in response to the amount of radiation being detected to control the high voltage bias applied to the counter in a manner to obtain a high proportional gas gain at low radiation levels, and decreases to less than unity gas gain at extreme dose rates. By clamping the bias voltage at a fixed level over the low end of the range a linear readout portion is obtained for dose rates in the 0 to 0.5 R/h range and a nonlinear readout is obtained in the 0.5 to greater than 500 R/h.

BRIEF DESCRIPTION OF THE DRAWINGS

The accompanying drawings, which are incorporated in and form a part of the specification, illustrate a preferred embodiment of the invention and, together with the description, serve to explain the principles of the invention.

It will be noted that the curve is linear over the region from 0 to 0.5 R/h and logarithmic in the region above 0.5 R/h.

DETAILED DESCRIPTION OF THE PREFERRED EMBODIMENT

Figure 1:
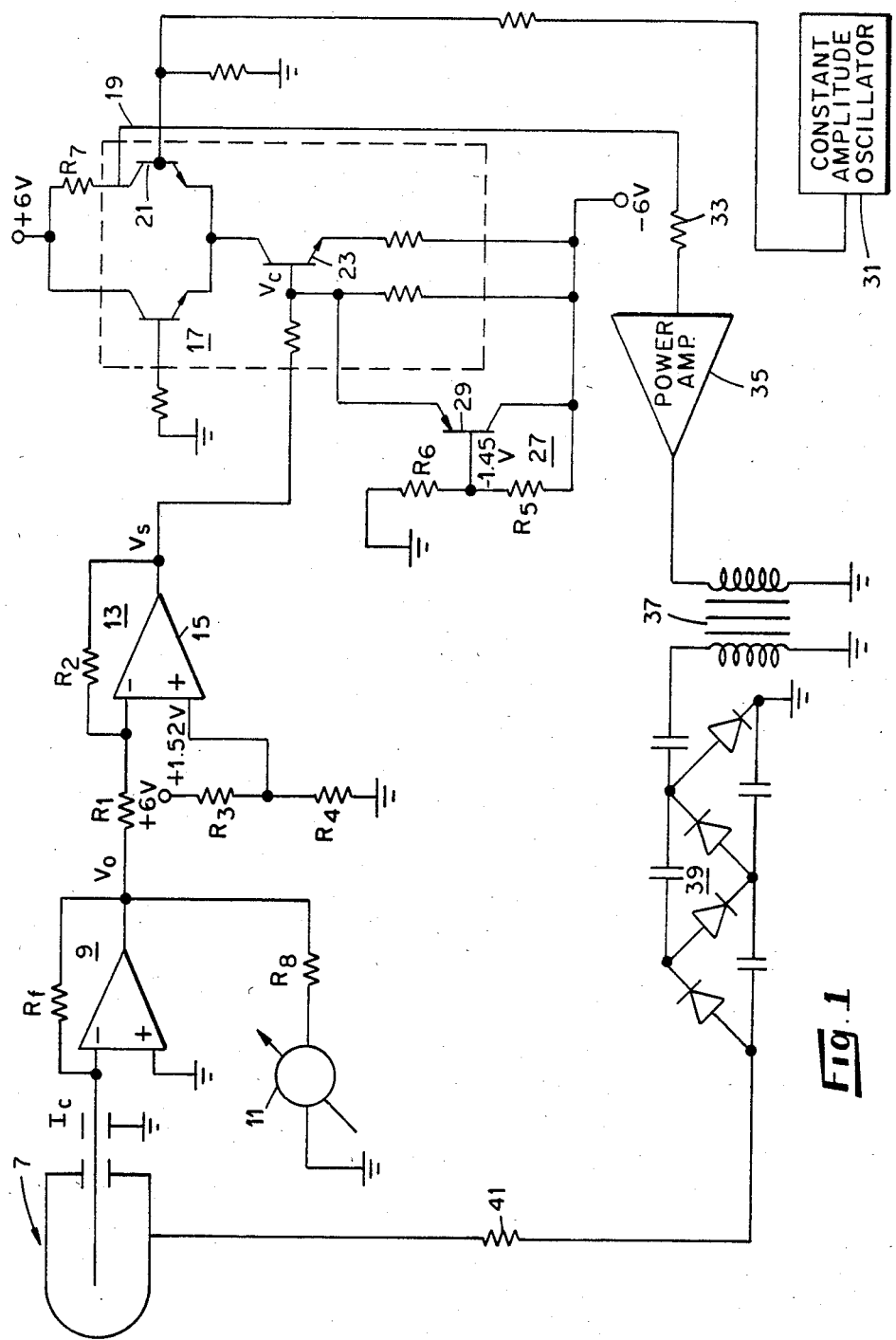
FIG. 1 is a schematic diagram of a wide-range radiation dose-rate monitor according to the present invention.

Referring to FIG. 1, there is shown a dose-rate monitor according to the present invention based on a gas filled proportional counter 7 operating in the current mode as the radiation detecting element. In this mode of operation, the individual pulses are not counted. Instead, the counter integrates the pulses and registers them as a current output. The proportional counter 7 is essentially a conventional gas filled proportional counter including an aluminum housing which may be filled with an ionizable gas having the approximate composition of biological tissue such as a mixture consisting of about 64.4 percent $CH_4$, 32.4 percent $CO_2$, and 3.2 percent $N_2$. The counter is preferably about 4 cm long by about 4 cm in diameter and has a wall thickness of about 3 mm. In the example described herein, the counter is filled with a gas mixture of Ar (80%) and $CF_4$ (20%) to provide an approximate air equivalent response to photon energies from about 0.03 to 1 MeV. The output current of the proportional counter 7 is a measure of the incident radiation dose-rate. Generally, the counter is responsive to x-rays, gamma rays and other ionizing radiation.

Scale compression for the measurement of dose-rates on a single scale in the range of from 0 to over 500 R/h is accomplished by controlling the detector 7 with a feedback circuit that senses the counter output current ($I_c$). The current $I_c$ is sensed by an electrometer amplifier 9 which is connected to the central wire anode of the counter 7 and converts the current $I_c$ to a proportional voltage $V_o$, where $V_o = R_f I_c$. This voltage is the measurement variable which drives a readout ammeter 11 (0 to 50 microamps) through a series resistor $R_8$ (30 ohms) connected between the output of the amplifier 9 and one side of an ammeter 11. The other side of the meter 11 is connected to ground potential. Thus, the sensitivity of the readout is 1.5 volts/50 microamps (1.5 V=full scale).

Figure 2:
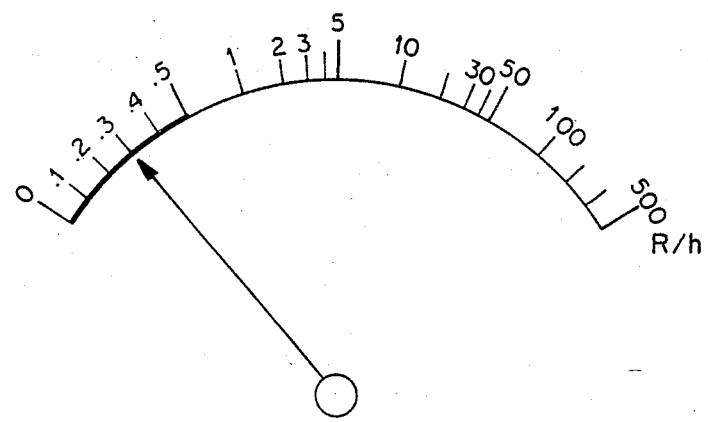
FIG. 2 is a schematic diagram of the readout scale showing the scale calibration for the meter 11 shown in FIG. 1.

The readout scale of the meter 11 is divided into two regions as shown in FIG. 2: linear from 0 to 0.5 R/h over the first approximately 25% of full scale and nonlinear (approximately logarithmic) from 0.5 to at least 500 R/h over the reamainder of the scale. In order to prevent saturation of the proportional counter over this extended range of operation and obtain the above-described scale compression, the counter bias voltage $V_b$ is decreased in absolute magnitude when the measured dose-rate exceeds the linear range. In the linear range (0 to 0.5 R/h) the bias voltage is held constant at −1.8 Kv and decreases in absolute magnitude, which in this case is an increase to −0.2 Kv (a factor of 9), as the radiation dose-rate increases from 0.5 to 500 R/h in the nonlinear region. Further, the bias voltage $V_b$ drops to 0 as the dose-rate increases without limits, which makes the circuit nonparalyzable. Thus, the counter 7 current output is a function of the bias voltage $V_b$ (i.e., the gas gain) and the dose-rate being measured.

In order to control the bias voltage in response to the dose-rate, the output of the electrometer amplifier 9 is connected to a feedback circuit which generates and controls the counter bias voltage. The feedback circuit includes a voltage gain amplifier 13 formed by an operational amplifier 15 having its inverting input (−) connected through a resistor $R_1$ to the output of the electrometer amplifier 9 ($V_o$) and its noninverting input (+) connected to a voltage divider formed by resistors $R_3$ and $R_4$ connected between a +6V supply and ground potential. A feedback resistor $R_2$ is connected between the output of amplifier 15 and the inverting input thereof. The values of $R_1$ (1.1 K ohms) and $R_2$ (4.3 K ohms) are selected to provide a gain of 3.91; i.e., $V_s=V_oR_2/R_1=3.91\ V_o$ and a dc level shift of 1.52 V provided by selecting a 1.52 V input to the noninverting input of amplifier 15 from the voltage divider where $R_3$ is 4.7 K ohms and $R_4$ is 1.6 K ohms. Therefore, $V_s=1.52-3.91\ V_o$ so that when $V_o=o$, $V_s=1.52$ V.

The output of amplifier 13 is connected to the input of a transconductance amplifier circuit 17, shown within dotted lines, such as a model CA3053 supplied by RCA, Deptford, N.J. 08096. This circuit functions as a comparator and controls the output signal amplitude on output line 19 of a signal applied to the base of transistor 21 by controlling the current flowing through resistor $R_7$ from the +6V supply through the transistor 21 and a current regulating transistor 23 to a −6V supply line 25 in response to a control voltage $V_c$ applied to the base of transistor 23. When the circuit is operating in the linear response region (dose-rates less than 0.5 R/h), $V_c$ does not change because it is clamped to −0.8V by a clamping circuit 27 and the amplitude of the output signal on line 19 is held at a maximum value. The clamping circuit 27 includes a transistor 29 having its emitter tied to the base of transistor 23 and the collector tied to the −6V supply line 25 and a voltage divider formed by $R_5$ and $R_6$ connected between line 25 and ground potential. By proper selection of the values of $R_5$ and $R_6$, the transistor 29 base voltage is set at −1.45V which forces the emitter voltage ($V_c$) to −0.8V, assuming a 0.65V base to emitter voltage drop. Thus, $V_c$ is clamped to −0.8V until $V_s$ goes negative, as the dose-rate increases, causing transistor 29 to stop conducting, thereby removing the clamp action. Thus, in the nonlinear range of the scale the change in $V_s$ controls the voltage $V_c$ and transconductance of amplifier 17, such that a decrease in transconductance reduces the output signal amplitude on output line 19.

The output signal on line 19 is an ac signal produced by applying a constant amplitude ac signal from a constant amplitude oscillator 31 to the base of transistor 21 in the transconductance amplifier 17. The oscillator frequency is set at about 8 KHz.

Figure 3:
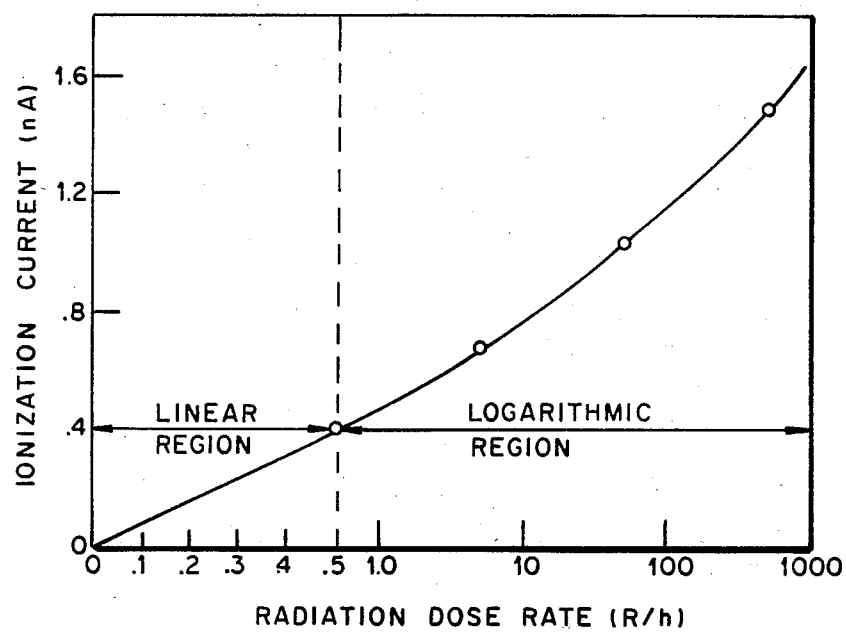
FIG. 3 is a calibration curve showing the ionization current from the counter 7 of FIG. 1 in response to the dose rate.

The output line 19 from the transconductance amplifier is connected through a resistor 33 to the input of a power amplifier 35. The output of amplifier 35 is connected through the primary winding of a step-up transformer 37 to ground potential. A rectifier/voltage quadrupler circuit 39 is connected to the secondary winding of transformer 37. The transformer has a turns ratio of about 1 to 67.5 to match the gain of amplifiers 17 and 35 to the rectifier so that an output voltage of −1.8 Kv is obtained over the linear sensing region when the output of transconductance amplifier 17 is locked at its maximum amplitude. The output of the rectifier/quadrupler 39, which is a negative voltage, is connected through a current limiting resistor 41 to the cathode of the proportional counter 7 formed by the outer aluminum housing. In the nonlinear region, $V_b$ decreases in absolute magnitude from −1.8 Kv to −0.2 Kv, as the radiation dose-rate increases from 0.5 to 500 R/h. Consequently, in the nonlinear region, the ionization current of the proportional counter ($I_c$) follows a smooth single-valued curve from 1.5 nA at 500 R/h and −0.2 kv bias to 0.4 nA at 0.5 R/h and −1.8 Kv bias. In the linear region, the value of $I_c$ varies linearly from 0.4 nA to 0 as the dose-rate decreases from 0.5 R/h to 0 as shown in FIG. 3. Thus, it will be seen that the feedback circuit generates and controls the bias voltage to control the avalanche multiplication factor (gas gain) of the counter 7 by varying the bias voltage in response to the measured output current (i.e., detected dose-rate). The counter output current varies linearly in the region from 0 to 0.5 R/h and logarithmically in the region from 0.5 to over 500 R/h as the bias voltage is decreased in magnitude from 1.8 Kv at the 0.5 R/h point to 0 volts.

Thus, it will be seen that a wide-range dose-rate monitor has been provided which allows dose-rates from 0 to greater than 500 R/h to be compressed onto a single readout scale which does not require scale switching.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suitable to the particular use contemplated. It is intended that the scope of the invention be defined by the claims appended hereto.

I claim:

1. A wide-range radiation dose-rate monitor, comprising:

a proportional counter having an anode and an ionizable gas disposed between said anode and said cathode for sensing ionizing radiation;

a current sensing means connected to said anode of said proportional counter for generating an output voltage signal proportional to an input current signal from said anode;

a meter connected to the output of said current sensing means and calibrated to indicated measured radiation dose-rate in response to said output signal of said current sensing means;

a constant amplitude oscillator for generating an a.c. output at a constant amplitude;

means for generating a selected clamping voltage signal at an output thereof;

a comparator circuit means responsive to the output voltage signal of said current sensing means and said clamping voltage signal for selectively attenuating the amplitude of said a.c. output signal of said constant amplitude oscillator at an output of said comparator circuit means in response to changes in the amplitude of the output of said current sensing means in excess of the clamping voltage;

a step-up transformer having a primary winding and a secondary winding;

a power amplifier connected between the output of said comparator circuit means and the primary winding of said transformer;

a rectifier/voltage multiplier circuit means connected between said secondary winding of said transformer and the cathode of said proportional counter for generating and applying a high voltage d.c. bias signal to said proportional counter which is proportional to the amplitude of the output signal of said comparator circuit means so that the bias voltage applied to said counter is controlled to obtain a fixed high proportional gas gain over a selected low radiation dose-rate range in which the voltage signal output of said current sensing means is less than said selected clamping voltage signal to provide an ionization current output from said proportional counter which varies linearly with the detected dose-rate over said selected low-radiation dose-rate range and decreasing the gas gain of said counter for radiation dose-rates above said selected low-radiation dose-rate range so that the ionization current output of said proportional counter varies nonlinearly with detected dose-rates above said selected low-radiation dose-rate range.

2. The monitor as set forth in claim 1 wherein said ionizable gas is a gas mixture which provides an approximate biological tissue response.

3. The monitor as set forth in claim 1 wherein said ionizable gas is a gas mixture which provides an approximate air equivalent response.

4. The monitor as set forth in claim 1 wherein said current sensing means is an electrometer amplifier.

* * * * *